(12) United States Patent
Yang et al.

(10) Patent No.: US 10,948,942 B2
(45) Date of Patent: Mar. 16, 2021

(54) DISPLAY DEVICE

(71) Applicant: Samsung Display Co., Ltd., Yongin-si (KR)

(72) Inventors: Sung-Jin Yang, Cheonan-si (KR); Chun Gi You, Asan-si (KR); Hyun Sik Park, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 48 days.

(21) Appl. No.: 16/387,477

(22) Filed: Apr. 17, 2019

(65) Prior Publication Data

US 2019/0243413 A1    Aug. 8, 2019

(30) Foreign Application Priority Data

Oct. 18, 2018    (KR) .................... 10-2018-0124395

(51) Int. Cl.
*G06F 1/16*    (2006.01)
*H04N 13/344*    (2018.01)
*G02B 27/01*    (2006.01)
*G09G 3/32*    (2016.01)

(52) U.S. Cl.
CPC ....... *G06F 1/1601* (2013.01); *G02B 27/0172* (2013.01); *G02B 27/0176* (2013.01); *G09G 3/32* (2013.01); *H04N 13/344* (2018.05)

(58) Field of Classification Search
None
See application file for complete search history.

(56) References Cited

U.S. PATENT DOCUMENTS

| 70,155,093 | 6/2017 | Jo | |
|---|---|---|---|
| 2017/0155093 A1* | 6/2017 | Jo | ................. G02B 7/021 |
| 2018/0149872 A1* | 5/2018 | Choi | ................. G02B 5/0242 |

FOREIGN PATENT DOCUMENTS

| KR | 10-1747268 | 6/2017 |
|---|---|---|
| KR | 10-2018-0003967 | 1/2018 |
| KR | 10-2018-0015697 | 2/2018 |
| KR | 10-2018-0061467 | 6/2018 |
| KR | 10-2018-0077752 | 7/2018 |

* cited by examiner

*Primary Examiner* — James Wu
*Assistant Examiner* — Christopher L Augustin
(74) *Attorney, Agent, or Firm* — H.C. Park & Associates, PLC

(57) ABSTRACT

A display device includes: a first substrate having a display area and a peripheral area; a display unit provided on the first substrate and including a plurality of pixels; a second substrate provided on the display unit; and an inorganic layer provided on the second substrate, wherein the inorganic layer includes a first auxiliary inorganic layer provided on the second substrate and including an opening, and a second auxiliary inorganic layer provided on the first auxiliary inorganic layer.

21 Claims, 15 Drawing Sheets

DISPLAY DEVICE

CROSS-REFERENCE TO RELATED APPLICATION

This application claims priority from and the benefit of Korean Patent Application No. 10-2018-0124395, filed on Oct. 18, 2018, which is hereby incorporated by reference for all purposes as if fully set forth herein.

BACKGROUND

Field

The present disclosure relates to a display device, and/or a head mounted display (HMD).

Discussion of the Background

From among display devices, an HMD is a device mounted on a head of a user and displaying an image to the user. The head mounted display device has attracted attention as a visualizing device for providing virtual reality (VR) or augmented reality (AR).

The head mounted display device includes a display panel for displaying images and an optical unit provided between the display panel and the user. The optical unit enlarges the images of the display panel and transmits them to the user.

When the image of the display panel is enlarged by using the optical unit, a screen door effect (SDE or a lattice effect) by which the image is seen like a net or non-pixel areas between pixel areas are visible as black is generated, and display quality and readability of characters are deteriorated.

The above information disclosed in this Background section is only for understanding of the background of the inventive concepts, and, therefore, it may contain information that does not constitute prior art.

SUMMARY

Devices constructed according to exemplary embodiments of the invention provide a display device with improved display quality.

Additional features of the inventive concepts will be set forth in the description which follows, and in part will be apparent from the description, or may be learned by practice of the inventive concepts.

An exemplary embodiment of the present invention provides a display device including: a first substrate including a display area and a peripheral area; a display unit provided on the first substrate and including a plurality of pixels; a second substrate provided on the display unit; and an inorganic layer provided on the second substrate, wherein the inorganic layer includes a first auxiliary inorganic layer provided on the second substrate and including an opening, and a second auxiliary inorganic layer provided on the first auxiliary inorganic layer.

The second auxiliary inorganic layer may have a surface-type form overlapping the display area.

The second auxiliary inorganic layer overlapping the opening may contact the second substrate.

A plane form of the opening may be circular.

The inorganic layer may be provided on a second side facing a first side of the second substrate provided toward the display unit.

The inorganic layer may include a concave portion and a convex portion.

The concave portion may overlap the opening.

A plane form of the concave portion may be circular.

A diameter of the concave portion may be 55% to 85% of a distance between centers of two adjacent concave portions.

A distance between centers of adjacent concave portions may be 5 μm to 10 μm.

A height difference between a first side of the concave portion and a first side of the convex portion may be 5000 Å to 7000 Å.

The inorganic layer may overlap the display area and the peripheral area.

The inorganic layer may include a first concave portion overlapping the display area, and a second concave portion overlapping the peripheral area.

A diameter of the first concave portion and a diameter of the second concave portion may be substantially the same.

A distance between centers of two adjacent first concave portions may be a first pitch, and a distance between centers of two adjacent second concave portions may be a second pitch.

The first pitch and the second pitch may be substantially the same.

Another embodiment of the present invention provides a display device including: a housing; a display panel mounted on the housing; and an optical unit overlapping the display panel, wherein the display panel includes a first substrate including a display area and a peripheral area, a display unit provided on the first substrate and including a plurality of pixels, and an inorganic layer provided on the display unit and including a concave portion and a convex portion, and the inorganic layer includes at least two layers.

The display device may include a second substrate or an encapsulation layer provided between the inorganic layer and the display unit.

The inorganic layer may include a first auxiliary inorganic layer provided on the display unit and including an opening, and a second auxiliary inorganic layer provided on the first auxiliary inorganic layer.

The inorganic layer may overlap the display area and the peripheral area.

The encapsulation layer may include a first encapsulating inorganic layer, a second encapsulating inorganic layer overlapping the first encapsulating inorganic layer, and an encapsulating organic film provided between the first encapsulating inorganic layer and the second encapsulating inorganic layer.

The inorganic layer may be provided on the second encapsulating inorganic layer.

According to the exemplary embodiments, an inorganic layer with a uniform surface may be provided, and displaying quality of the display device may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
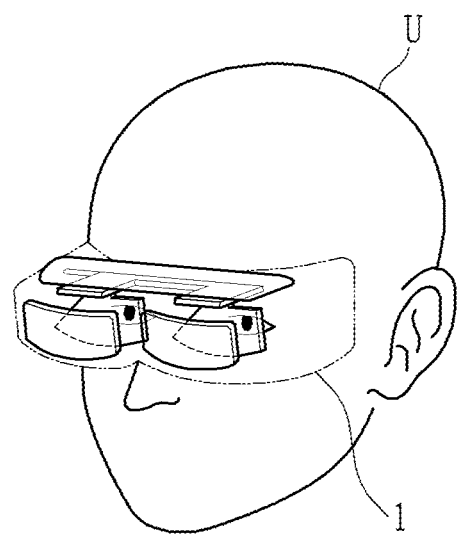
FIG. 1A and FIG. 1B show a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
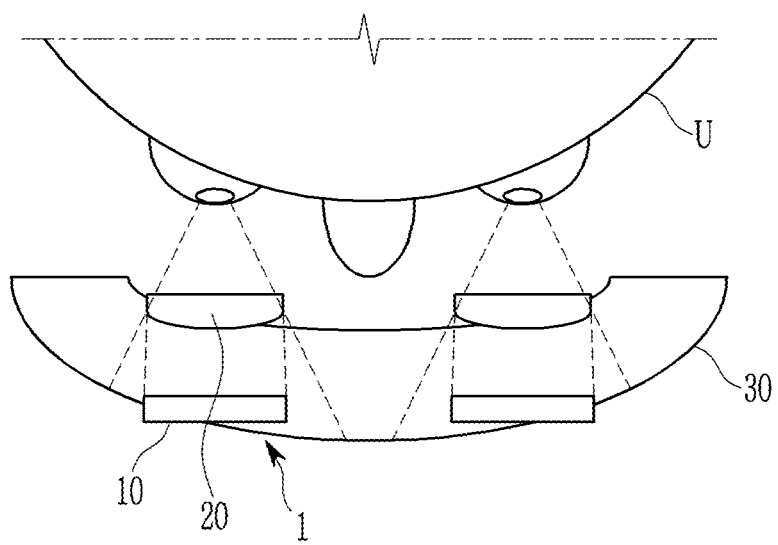

A display device according to an exemplary embodiment will now be described with reference to FIG. 1A and FIG. 1B. FIG. 1A and FIG. 1B show a display device according to an exemplary embodiment. For ease of description, a state in which the display device is mounted on the user is illustrated.

As shown in FIG. 1A, the display device 1 is mounted on a head of the user U to display an image to the eyes (right eye and left eye) of the user U. Further, referring to FIG. 1B, the display device 1 includes a display panel 10, an optical unit 20 overlapping the display panel 10, and a housing 30 on which the display panel 10 and the optical unit 20 are mounted.

The display panel 10 is mounted on the housing 30 and displays images. The display panel 10 may include a plurality of display panels 10 corresponding to the right eye and the left eye of the user U. The present specification shows a form in which the display panels 10 corresponding to the right eye and the left eye are separated, it is not limited thereto, and the display panels corresponding to the right eye and the left eye may be connected to each other to have an integrated form without departing from the scope of the inventive concepts.

The display panel 10 may be an emission display panel, it is not limited thereto, and it may be a liquid crystal panel.

The optical unit 20 overlaps the display panel 10 and is provided between the user U and the display panel 10. The optical unit 20 refracts the image displayed by the display panel 10 in an eyeball direction of the user U. The display device 1 may include a plurality of optical units 20 corresponding to the right eye and the left eye.

For example, the optical unit 20 may include a convex lens that is convex toward the display panel 10. The optical unit 20 may include a concave lens for correcting distortion generated by the convex lens. In this instance, the concave lens may be an aspherical lens, and the present embodiment is not limited thereto.

The housing 30 may be made of any forms when it may be mounted on the head of the user U while the display panel 10 and the optical unit 20 are mounted. The housing 30 may have various shapes, for example, a glasses shape or a helmet shape.

Figure 2:
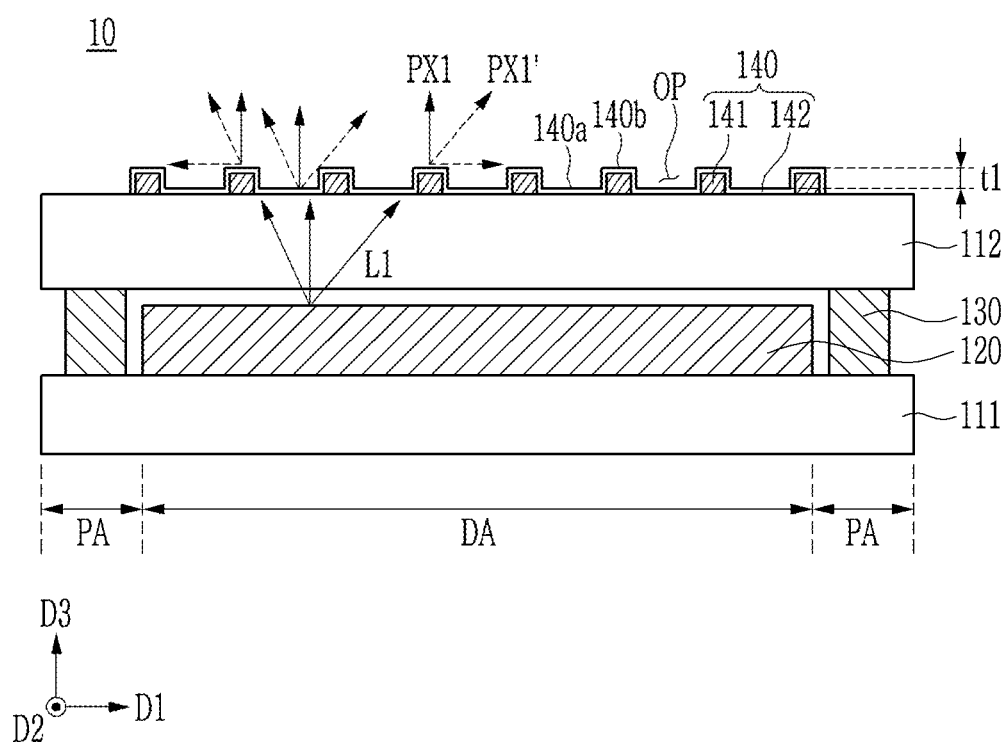
FIG. 2 shows a cross-sectional view of a display panel according to an exemplary embodiment.

A configuration of a display panel according to an exemplary embodiment will now be described with reference to FIG. 2 to FIG. 4B. FIG. 2 shows a cross-sectional view of a display panel according to an exemplary embodiment, FIG. 3 shows a top plan view of a display panel according to an exemplary embodiment, FIG. 4A shows a pattern form that is visible to a user when an inorganic layer is removed in a display panel, and FIG. 4B shows a form that is visible to a user when an inorganic layer is included.

Figure 3:
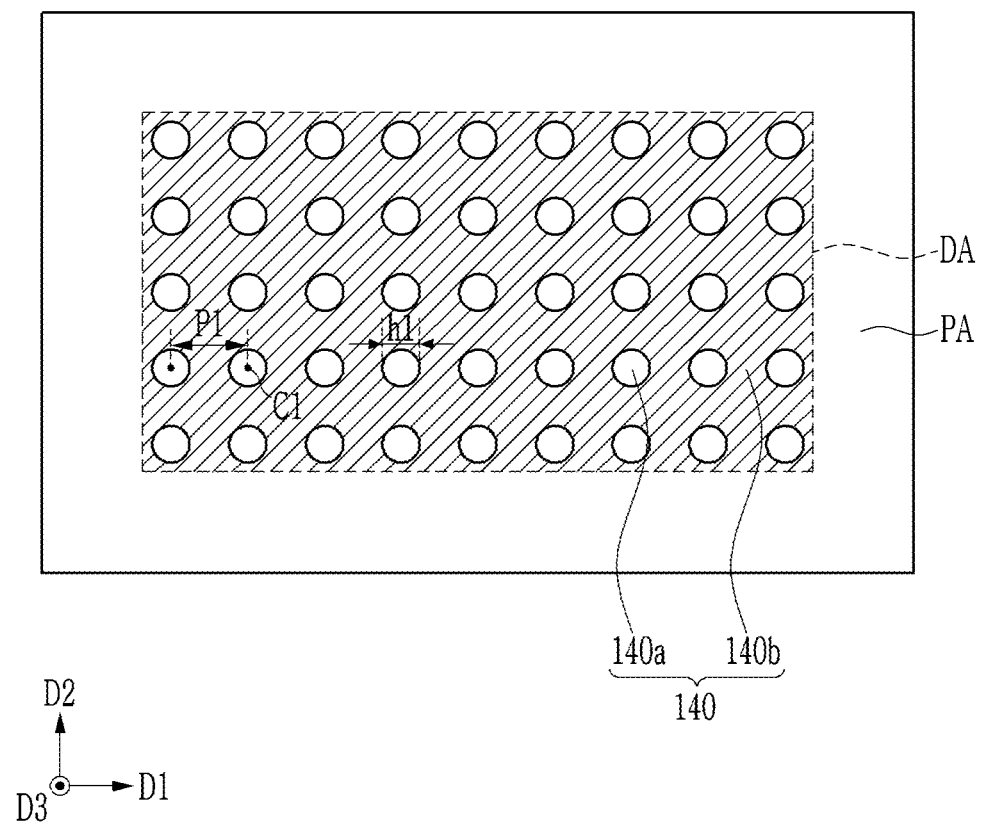
FIG. 3 shows a top plan view of a display panel according to an exemplary embodiment.
Figure 4A:
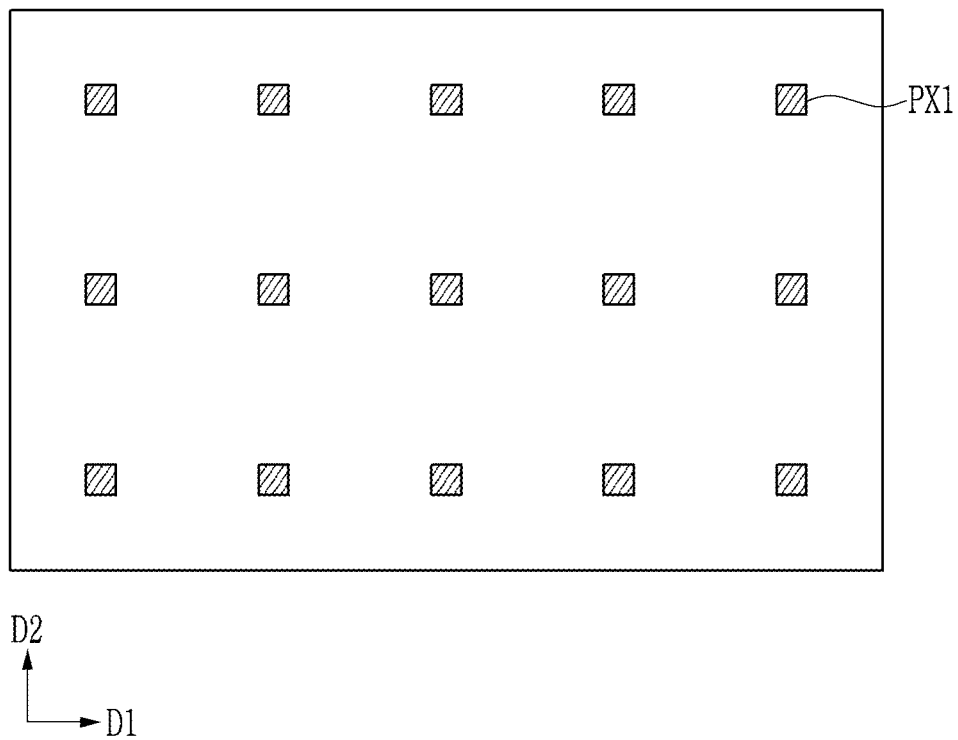
FIG. 4A shows a form that is visible to a user when an inorganic layer is removed.
Figure 4B:
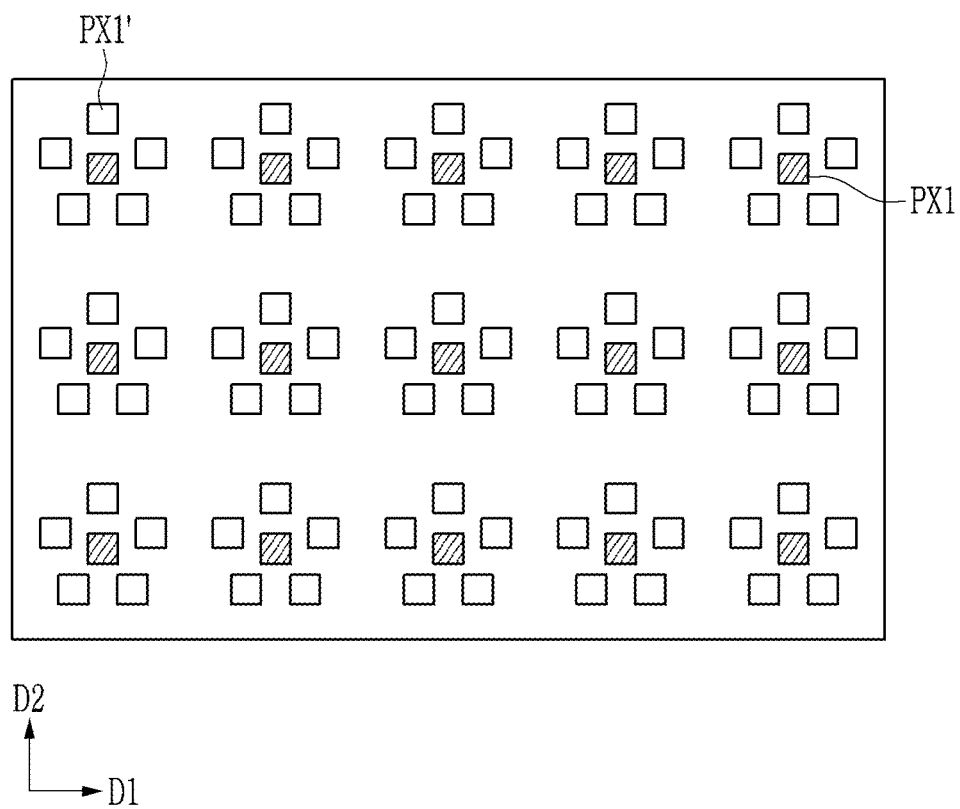
FIG. 4B shows a form that is visible to a user when an inorganic layer is included.

Referring to FIG. 2 and FIG. 3, the display panel 10 includes a display unit 120 provided on a first substrate 111 and including a plurality of pixels, a second substrate 112 for covering the display unit 120, a sealer 130 for combining the first substrate 111 and the second substrate 112, and an inorganic layer 140 provided on the second substrate 112.

The first substrate 111 according to an exemplary embodiment includes a display area DA overlapping a plurality of pixels, and a peripheral area PA surrounding the display area DA. The peripheral area PA may overlap an edge of the first substrate 111 and may be provided outside the display area DA.

The first substrate 111 may be an insulating substrate including glass, quartz, ceramic, or plastic, or it may be a metal substrate including stainless steel. The first substrate 111 may be flat or flexible depending on exemplary embodiments.

The display unit 120 may include a plurality of pixels. One pixel may include a thin film transistor and a light emitting diode LED connected to the thin film transistor. The thin film transistor and the light emitting diode LED connected to the thin film transistor will be described in a later part of the present specification with reference to FIG. 10. The display unit 120 is not limited to an exemplary embodiment including a thin film transistor and a light emitting diode LED, and it may include a thin film transistor and a liquid crystal layer.

The second substrate 112 may be an encapsulation substrate provided on the display unit 120. The second substrate 112 may be an insulating substrate including glass, quartz, ceramic, or plastic, or it may be a metal substrate including stainless steel. The second substrate 112 may be a transparent resin substrate or a flat substrate with softness or flexibility.

The inorganic layer 140 may be provided on the second substrate 112. The inorganic layer 140 may be provided outside the second substrate 112. The inorganic layer 140 may be provided on a second side facing a first side of the second substrate 112 provided toward the display unit 120. The display unit 120, the second substrate 112, and the inorganic layer 140 may be sequentially stacked in a direction D3 with respect to the first substrate 111.

The inorganic layer 140 may overlap the first substrate 111 and the second substrate 112. Particularly, the inorganic layer 140 may overlap the display area DA.

The inorganic layer 140 may include at least two layers. The inorganic layer 140 may include a multi-layered structure, and for example, the inorganic layer 140 may include a first auxiliary inorganic layer 141 and a second auxiliary inorganic layer 142. The present specification shows an exemplary embodiment in which the inorganic layer 140 is made of a double-layered structure, and it may also include a further multi-layered structure.

The inorganic layer 140 may include any kinds of inorganic materials, for example, a silicon nitride or a silicon oxide. The first auxiliary inorganic layer 141 and the second auxiliary inorganic layer 142 may include different inorganic materials or a same inorganic material. When including the same inorganic material, the first auxiliary inorganic layer 141 and the second auxiliary inorganic layer 142 may distinguish respective layers, and without being limited to this, the first auxiliary inorganic layer 141 and the second auxiliary inorganic layer 142 may be seen as a single layer.

The first auxiliary inorganic layer 141 may include an opening OP. The opening OP may completely pass through the first auxiliary inorganic layer 141 in a thickness direction (the direction D3). The opening OP may refer to a region from which the first auxiliary inorganic layer 141 is removed in the thickness direction (the direction D3).

For example, the opening OP may be circular in a plane view. However, the shape of the opening OP in a plane view is not limited thereto, and it may be various such as triangular, quadrangular, polygonal, or oval.

The second auxiliary inorganic layer 142 may be provided on the first auxiliary inorganic layer 141 including a plurality of openings OP. The second auxiliary inorganic layer 142 may be provided as a surface on the second substrate 112. The second auxiliary inorganic layer 142 may completely cover the first auxiliary inorganic layer 141, and it may overlap the opening OP included by the first auxiliary inorganic layer 141.

The second auxiliary inorganic layer 142 may have a step according to the shape of the first auxiliary inorganic layer 141. The second auxiliary inorganic layer 142 may be provided on the second substrate 112 in a region overlapping the opening OP, and the second auxiliary inorganic layer 142 may be provided on the first auxiliary inorganic layer 141 in the remaining region that does not overlap the opening OP. In the region overlapping the opening OP, the second auxiliary inorganic layer 142 may contact the second substrate 112.

The inorganic layer 140 may include a concave portion 140a overlapping the opening OP and a convex portion 140b. The concave portion 140a overlaps the opening OP and the second auxiliary inorganic layer 142. The convex portion 140b overlaps the first auxiliary inorganic layer 141 and the second auxiliary inorganic layer 142.

The concave portion 140a may have a same form as the opening OP included by the first auxiliary inorganic layer 141. As shown in FIG. 3, for example, the form of the concave portion 140a in a plane view may be circular. However, the plane form of the concave portion 140a is not limited thereto, and it may be various such as triangular, quadrangular, polygonal, or oval.

In the present specification, a distance between centers C1 of the two adjacent concave portions 140a will be referred to as a pitch P1. The pitch P1 according to an exemplary embodiment may be about 5 μm to 10 μm. When the pitch P1 is less than about 5 μm or greater than about 10 μm, light passing through the inorganic layer 140 may not be efficiently diffracted or scattered.

A diameter h1 of one concave portion 140a may be about 55% to 85% of the pitch P1, and for example, it may be about 65% to 75%. When the diameter h1 of the concave portion 140a is less than about 55% of the pitch P1 or greater than about 85%, light passing through the inorganic layer 140 may not be efficiently diffracted or scattered.

A height difference t1 between the concave portion 140a and the convex portion 140b may be about 5000 Å to 7000 Å. In detail, a height difference between the top side of the concave portion 140a and the top side of the convex portion 140b may be about 5000 Å to 7000 Å. For example, when the first auxiliary inorganic layer 141 is about 6000 Å thick and the second auxiliary inorganic layer 142 is about 2000 Å thick, the height difference between the concave portion 140a and the convex portion 140b may be about 6000 Å. Within the range in which the height t1 difference between the first side of the concave portion 140a and the first side of the convex portion 140b satisfies the numerical range, respective thicknesses of the first auxiliary inorganic layer 141 and the second auxiliary inorganic layer 142 are changeable and are not limited to the above-described embodiment.

When the inorganic layer 140 is provided on the second substrate 112 in a like manner of an exemplary embodiment, light L1 output by the display unit 120 may be diffracted, scattered, or refracted. This will now be described with reference to FIG. 2, FIG. 4A, and FIG. 4B.

FIG. 4A shows the case in which an additional inorganic layer is not provided on the second substrate 112. As shown in FIG. 4A, one pixel included by the display unit 120 may be seen as a pixel PX1 by the user through discharging of light.

However, when the inorganic layer 140 provided on the second substrate 112 is included according to an exemplary embodiment, the light L1 output by the display unit 120 may be transmitted to the user, and it may be diffracted as shown with dotted arrows of FIG. 2. According to the diffraction of the light output by the display unit 120, as shown in FIG. 4B, a plurality of virtual pixels PX1' may be seen by the user with respect to one pixel PX1. A plurality of virtual pixels PX1' may have an effect such as that one pixel PX1 is duplicated. According to this, it may be possible to provide high-resolution images compared to the actual resolution of the display unit 120.

The display device according to an exemplary embodiment includes an optical unit 20, so the image provided by the display unit 120 may be enlarged. In this instance, a screen door effect in which a shape such as a net is visible or a non-pixel area between pixel areas is seen as black may occur. According to an exemplary embodiment, when a plurality of virtual pixels PX1' are seen as of one pixel PX1 that is duplicated, it appears as if an additional pixel is provided in the region seen as black between the actual pixels PX1, and the screen door effect may be reduced.

The inorganic layer 140 according to an exemplary embodiment may include, as described above, a plurality of concave portions 140a and convex portions 140b so as to realize the effect of duplicating the pixel.

The first auxiliary inorganic layer 141 may be manufactured through a manufacturing process for stacking inorganic materials and forming an opening OP. During the process for forming an opening OP, part of the first auxiliary inorganic layer 141 may be separated or an edge of the opening OP may be formed to not be smooth. When the opening OP with a non-uniform surface or shape is included, diffraction of light may not be efficiently generated, and the screen door effect may not be reduced.

The inorganic layer 140 according to an exemplary embodiment may include a second auxiliary inorganic layer 142 uniformly stacked on the first auxiliary inorganic layer 141 including the opening OP. The second auxiliary inorganic layer 142 may make the surface (that is not uniform) of the first auxiliary inorganic layer 141 smooth, so uniformity of the surface of the inorganic layer 140 may be improved. According to this, light output through the inorganic layer 140 may be uniformly diffracted (or scattered or refracted), and the screen door effect may be improved through an effect such as duplication of pixels. The display quality of the display panel according to an exemplary embodiment may thus be improved.

Figure 5:
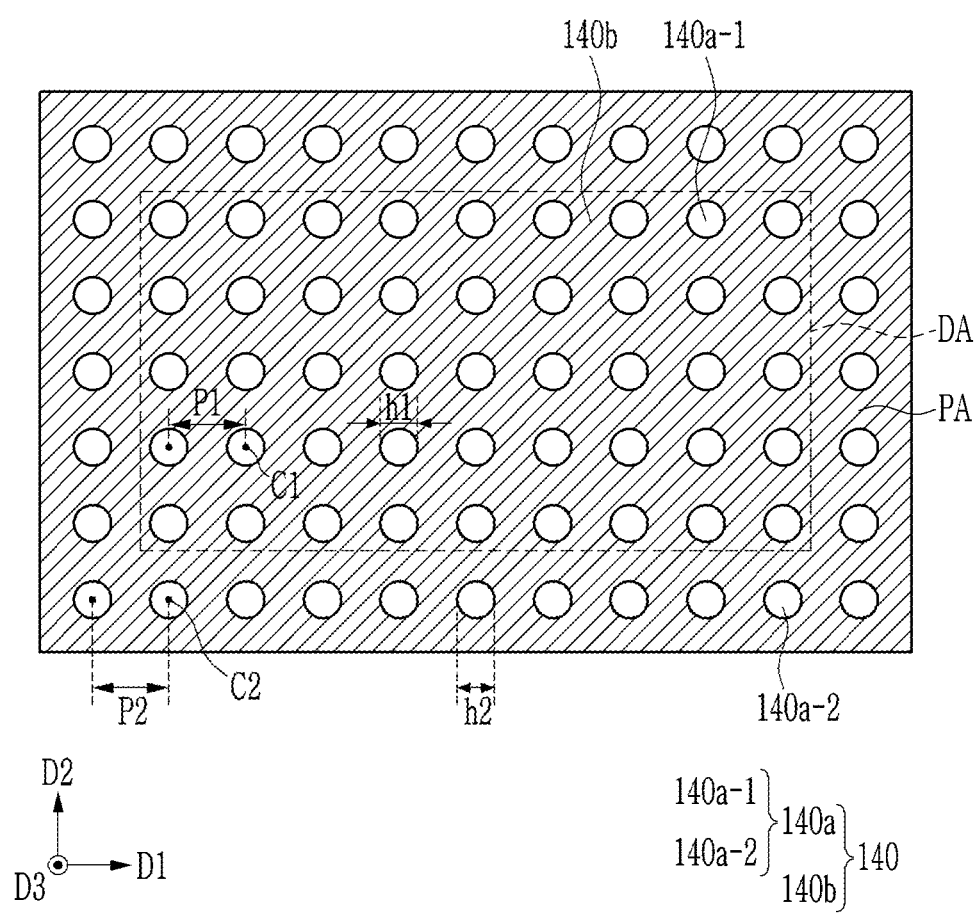
FIG. 5, FIG. 6, and FIG. 7 show top plan views of a display panel according to an exemplary embodiment.
Figure 6:
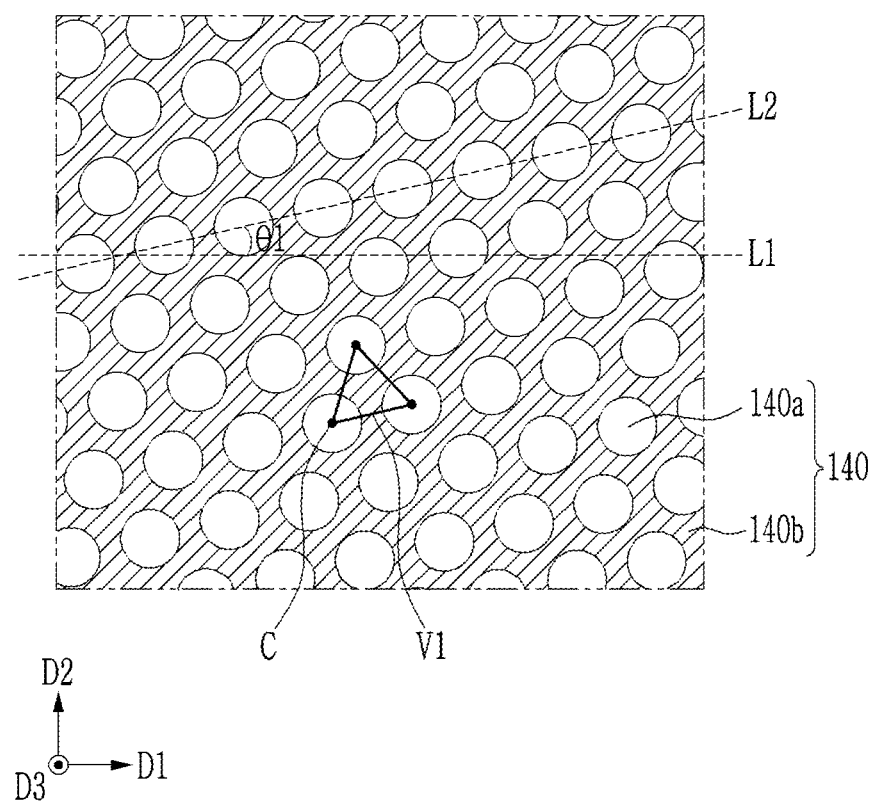
Figure 7:
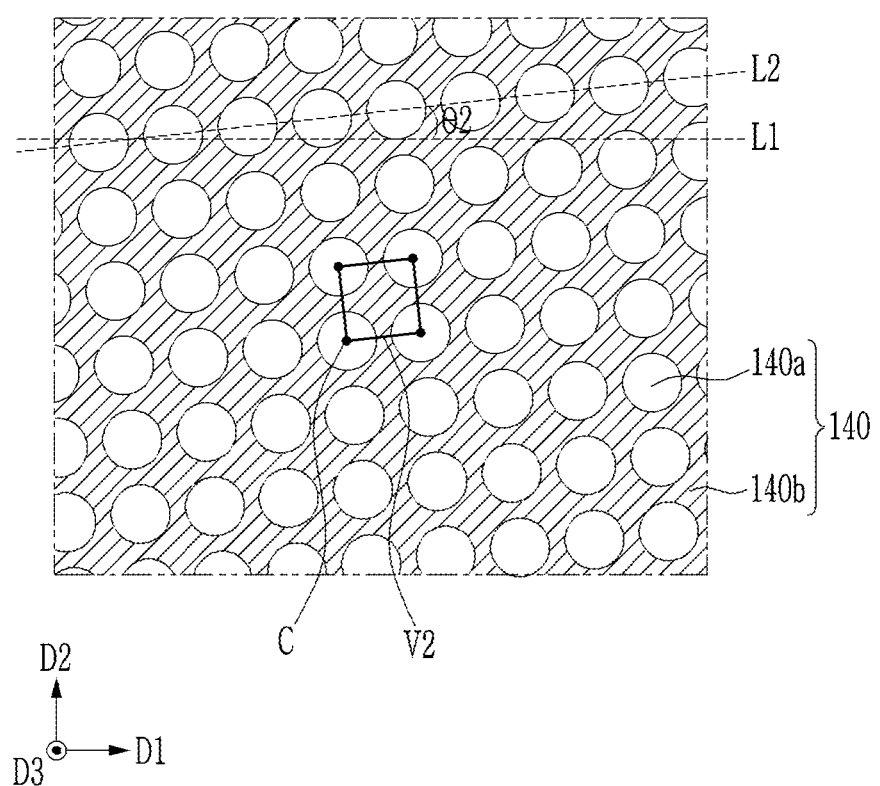
Figure 8:
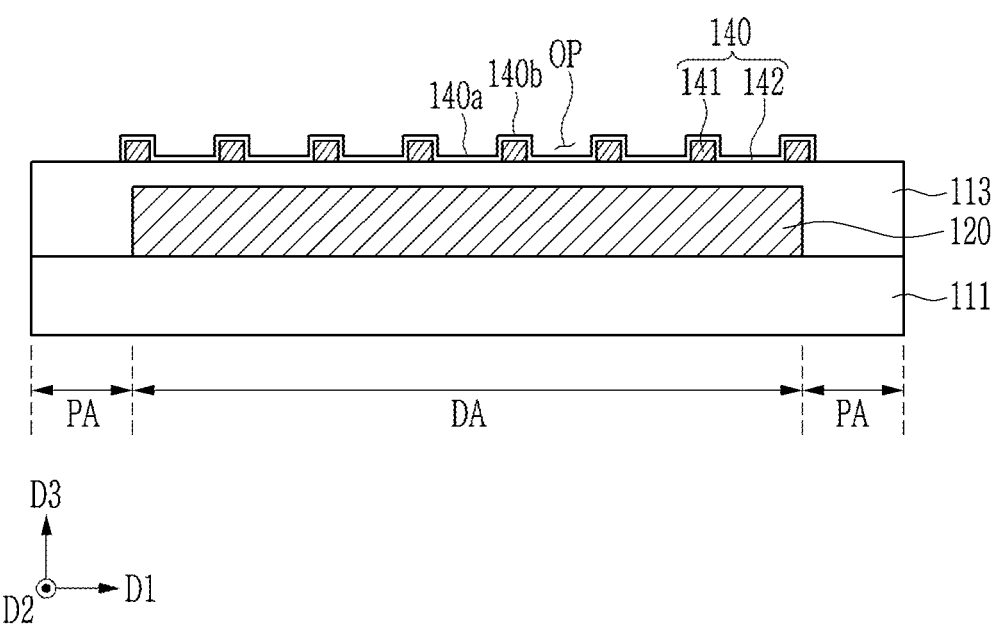
FIG. 8, FIG. 9, and FIG. 10 show cross-sectional views of a display panel according to an exemplary embodiment.
Figure 9:
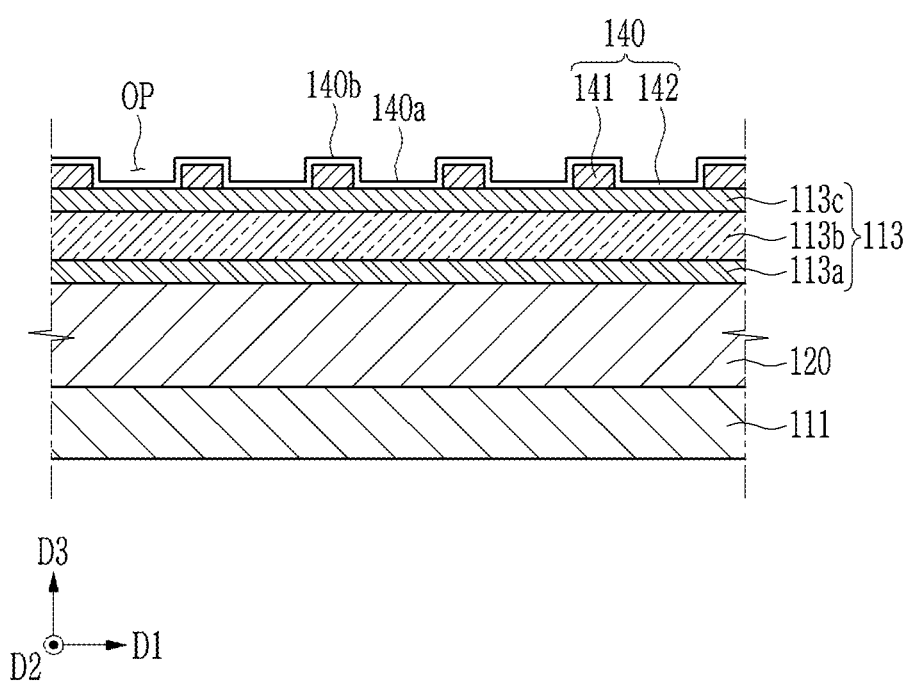
Figure 10:
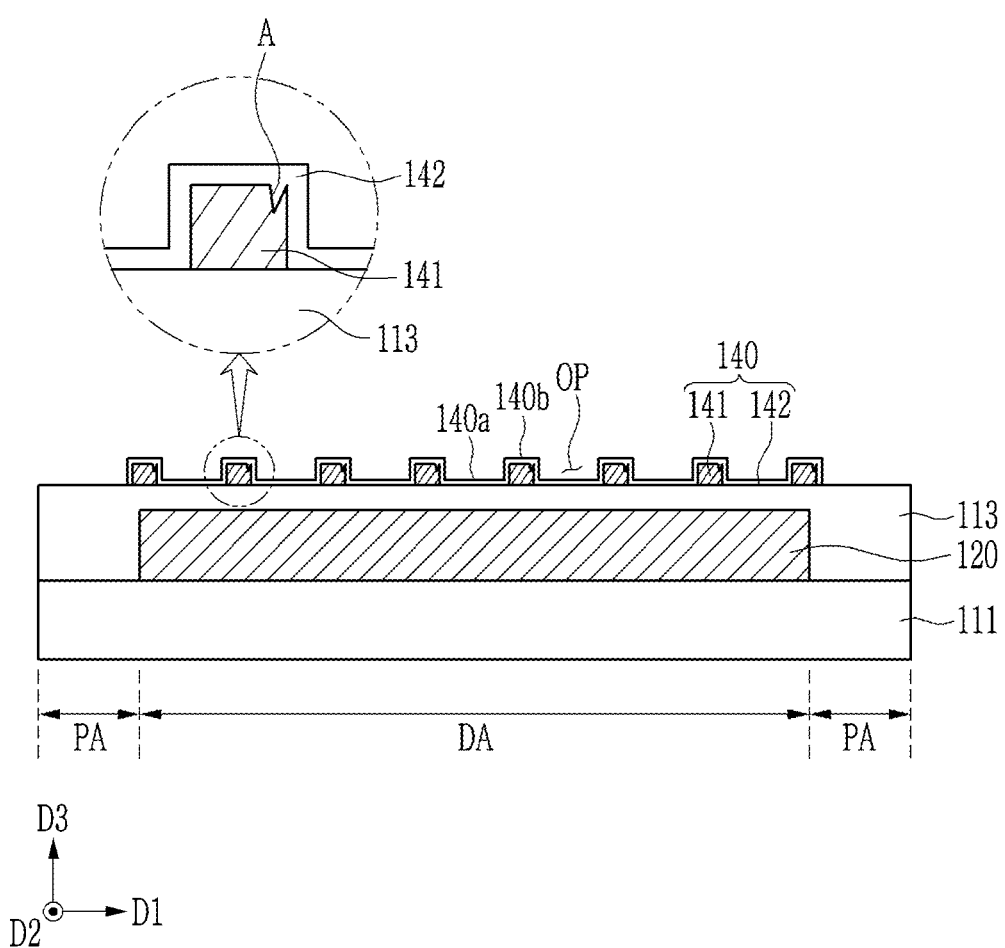
Figure 11:
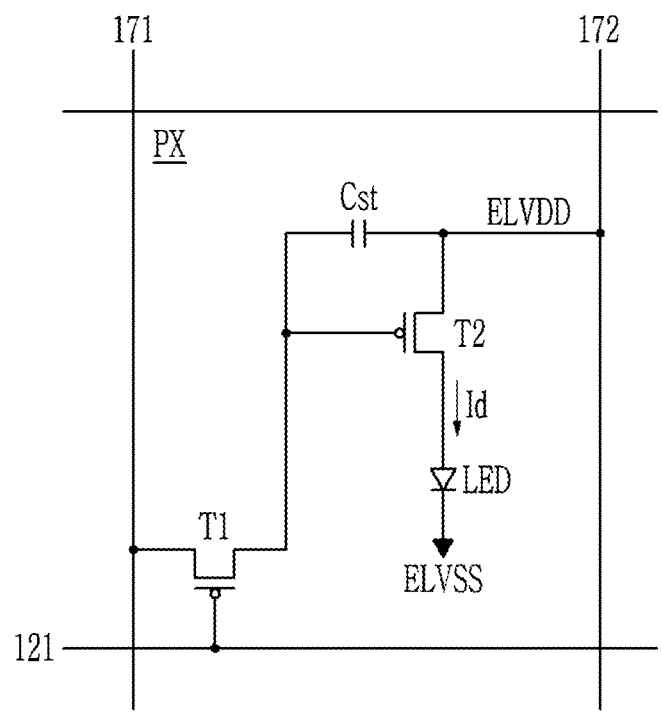
FIG. 11 shows a circuit diagram of a pixel included by a display unit according to an exemplary embodiment.

A display panel according to an exemplary embodiment will now be described with reference to FIG. 5 to FIG. 11. FIG. 5, FIG. 6, and FIG. 7 show top plan views of a display panel according to an exemplary embodiment, FIG. 8, FIG. 9, and FIG. 10 show cross-sectional views of a display panel according to an exemplary embodiment, and FIG. 11 shows a circuit diagram of a pixel according to an exemplary embodiment. Descriptions on the constituent elements provided in the above-described exemplary embodiment may be omitted.

Referring to FIG. 5, the inorganic layer 140 may overlap the display area DA and the peripheral area PA.

The concave portion 140a and the convex portion 140b included by the inorganic layer 140 may overlap the display area DA and the peripheral area PA. The concave portion 140a may include a first concave portion 140a-1 overlapping the display area DA, and a second concave portion 140a-2 overlapping the peripheral area PA. Although not shown in FIG. 5, as described above, the concave portion 140a may overlap the opening of the first and second auxiliary inorganic layers, and the convex portion 140b may overlap the first and second auxiliary inorganic layers.

The form of the concave portion 140a in a plane view may exemplarily be circular. However, the plane form of the concave portion 140a is not limited thereto, and it may be various such as triangular, quadrangular, polygonal, or oval.

The present specification will refer to the distance between centers of the adjacent concave portions 140a as a pitch.

Referring to FIG. 5, with respect to two adjacent first concave portions 140a-1 overlapping the display area DA, a distance between centers C1 of the first concave portions 140a-1 is a first pitch P1. With respect to two adjacent second concave portions 140a-2, a distance between centers C2 of the second concave portions 140a-2 provided in the peripheral area PA is a second pitch P2.

The first pitch P1 and the second pitch P2 may be substantially the same. A distance between the centers of a plurality of first concave portions 140a-1 overlapping the display area DA may be substantially the same as a distance between the centers of a plurality of second concave portions 140a-2 overlapping the peripheral area PA. Across the display area DA and the peripheral area PA, intervals between a plurality of concave portions 140a may be substantially the same. In this instance, a gap or a distance between a plurality of concave portions 140a refers to a minimum straight distance between adjacent concave portions 140a.

The first pitch P1 and the second pitch P2 may respectively be about 5 μm to 10 μm. When the first pitch P1 and the second pitch P2 are less than about 5 μm or greater than about 10 μm, light passing through the inorganic layer 140 may not be efficiently diffracted, scattered, or refracted.

A diameter h1 of the first concave portion 140a-1 provided in the display area PA may be substantially the same as a diameter h2 of the second concave portion 140a-2 overlapping the peripheral area PA. As shown in FIG. 5, sizes of the planes of the first concave portion 140a-1 overlapping the display area DA and the second concave portion 140a-2 overlapping the peripheral area PA may be substantially the same. A plurality of concave portions 140a overlapping the display area DA and the peripheral area PA may have substantially the same size.

A diameter h1 of the first concave portion 140a-1 overlapping the display area DA may be about 55% to 85% of the first pitch P1, for example, about 65% to 75% thereof. A diameter h2 of the second concave portion 140a-2 provided in the peripheral area PA may be about 55% to 85% of the second pitch P2, for example, about 65% to 75% thereof. The first concave portion 140a-1 and the second concave portion 140a-2 may have substantially the same diameter in the range. When the diameters h1 and h2 of the first concave portion 140a-1 and the second concave portion 140a-2 are less than 55% of the pitch or greater than 85% of the pitch, light output by the display unit 120 may not be efficiently diffracted, scattered, or refracted.

The present specification describes the exemplary embodiment in which the concave portions included by the inorganic layer are arranged with the same interval and the same size in the display area DA and the peripheral area PA, but the present embodiment is not limited thereto. The first concave portion 140a-1 overlapping the display area DA and the second concave portion 140a-2 overlapping the peripheral area PA may be modified to have different sizes or different intervals.

Referring to FIG. 6, the inorganic layer 140 may include a concave portion 140a and a convex portion 140b.

Here, a virtual triangle V1 may be formed by connecting the centers C of three adjacent concave portions 140a. The virtual triangle V1 may exemplarily be an equilateral triangle or an isosceles triangle, to which the embodiment is not limited.

Further, a virtual second line L2 passing through the centers C of a plurality of concave portions 140a may be inclined with respect to a virtual first line L1 in parallel with the direction D1 according to an exemplary embodiment. A first angle θ1 between the first line L1 and the second line L2 may be about 3 degrees (°) to 30°.

In this instance, the virtual second line L2 may be a line that is inclined with a minimum angle from the first virtual line L1 from among a plurality of virtual lines passing through the centers of a plurality of concave portions. The virtual first line L1 may be parallel to the direction D1, and it may be a line that is substantially parallel to an edge of the first substrate.

Referring to FIG. 7, the inorganic layer 140 may include a concave portion 140a and a convex portion 140b.

A virtual quadrangle V2 may be formed by connecting the centers C of four adjacent concave portions 140a. The four corners of the virtual quadrangle V2 may be 90°, and for example, it may be a square or a rectangle, but it is not limited thereto.

Depending on exemplary embodiments, the virtual second line L2 passing through the centers C of a plurality of concave portions 140a may be inclined with respect to the first virtual line L1 that is parallel to the direction D1. A second angle θ2 between the first line L1 and the second line L2 may be about 3° to 30°.

In this instance, the virtual second line L2 may be a line that is inclined by the minimum angle from the first virtual line L1 from among a plurality of virtual lines passing through the centers of a plurality of concave portions 140a. The virtual first line L1 may be parallel to the direction D1. For example, the virtual first line L1 may be substantially parallel to one edge of the substrate.

Referring to FIG. 8, the display panel 10 includes a first substrate 111, a display unit 120 provided on the first substrate 111, an encapsulation layer 113 for covering the display unit 120, and an inorganic layer 140 provided on the encapsulation layer 113. The display panel 10 may be a flat display panel or a flexible display panel that may be bent, folded, or rolled depending on exemplary embodiments.

The first substrate 111 includes a display area DA overlapping a plurality of pixels and a peripheral area PA surrounding the display area DA. The peripheral area PA may overlap the edge of the first substrate 111 and is provided outside the display area DA.

The first substrate 111 may be an insulating substrate including glass, quartz, ceramic, or plastic, or it may be a metal substrate including stainless steel. The first substrate 111 may be flat or flexible according to exemplary embodiments.

The display unit 120 may include a plurality of pixels. One pixel may include a thin film transistor and a light emitting diode LED connected to the thin film transistor. The thin film transistor and the light emitting diode LED connected thereto will be described in a later portion of the present specification with reference to FIG. 11. The display unit 120 may include a thin film transistor and a liquid crystal layer without being limited to an exemplary embodiment including a thin film transistor and a light emitting diode LED.

The encapsulation layer 113 may include a structure in which an organic film and an inorganic layer are alternately stacked. For example, the encapsulation layer 113 may include a structure in which a first organic film is stacked between the first inorganic layer and the second inorganic layer. The encapsulation layer 113 may prevent oxygen or moisture from permeating into the display unit 120.

The encapsulation layer 113 according to an exemplary embodiment will now be described in detail with reference to FIG. 9.

The encapsulation layer 113 may include a structure in which at least one inorganic layer and at least one organic film are stacked. According to an exemplary embodiment, the encapsulation layer 113 may include a first encapsulating inorganic layer 113a, an encapsulating organic film 113b, and a second encapsulating inorganic layer 113c. Regarding the encapsulation layer 113, the first encapsulating inorganic layer 113a and the second encapsulating inorganic layer 113c generally prevent the permeation of moisture, and the encapsulating organic film 113b may flatten a surface of the encapsulation layer 113, particularly the top side of the encapsulation layer 113.

The first encapsulating inorganic layer 113a and the second encapsulating inorganic layer 113c may include an inorganic insulating material such as a silicon oxide or a silicon nitride. The encapsulating organic film 113b may include an organic material such as an acryl-based resin, a methacryl-based resin, a polyisoprene, a vinyl-based resin, an epoxy-based resin, a urethane-based resin, a cellulose-based resin, or a perylene-based resin.

The inorganic layer 140 may be provided on the encapsulation layer 113. For example, it may be provided on the second encapsulating inorganic layer 113c of the encapsulation layer 113, and without being limited to this, it may be provided on an organic film when the uppermost layer of the encapsulation layer 113 is the organic film.

The inorganic layer 140 corresponds to be above-provided description so no detailed description thereof will be provided Referring to FIG. 10, the first auxiliary inorganic layer 141 according to an exemplary embodiment may include a groove A with an irregular form.

The first auxiliary inorganic layer 141 may be formed by stacking an inorganic material on the encapsulation layer 113 (or a second substrate) and patterning the inorganic material. In the process for patterning an inorganic material to form an opening OP, part of the inorganic material may be taken out, and the first auxiliary inorganic layer 141 may include a groove A as shown in FIG. 10.

The second auxiliary inorganic layer 142 is provided on the first auxiliary inorganic layer 141. The second auxiliary inorganic layer 142 may overlap the opening OP and the groove A included by the first auxiliary inorganic layer 141. The second auxiliary inorganic layer 142 may have a form that fills the groove A.

When the inorganic layer 140 includes a first auxiliary inorganic layer 141 with a non-uniform surface, it may provide the inorganic layer 140 with a smooth surface by the second auxiliary inorganic layer 142 filling the groove A.

One pixel included by the display panel will now be described with reference to FIG. 11.

As shown in FIG. 11, one pixel PX included in the display panel according to an exemplary embodiment includes signal lines 121, 171, and 172, transistors T1 and T2 connected to the signal lines 121, 171, and 172, a storage capacitor Cst, and a light emitting diode LED.

The transistors T1 and T2 may include a switching transistor T1 and a driving transistor T2.

The signal lines 121, 171, and 172 include a scan line 121 for transmitting a scan signal Sn, a data line 171 crossing the scan line 121 and transmitting a data signal Dm, and a driving voltage line 172 for transmitting a driving voltage ELVDD and having a form that is substantially parallel to the data line 171.

The switching transistor T1 includes a control terminal, an input terminal, and an output terminal. The control terminal is connected to the scan line 121, the input terminal is connected to the data line 171, and the output terminal is connected to the driving transistor T2. The switching transistor T1 transmits the data signal Dm applied to the data line 171 to the driving transistor T2 in response to the scan signal Sn applied to the scan line 121.

The driving transistor T2 includes a control terminal, an input terminal, and an output terminal. The control terminal is connected to the switching transistor T1, the input terminal is connected to the driving voltage line 172, and the output terminal is connected to the light emitting diode LED. The driving transistor T2 transmits a driving current Id of which a magnitude is changed by the voltage between the control terminal and the output terminal.

The storage capacitor Cst is connected between the control terminal and the input terminal of the driving transistor T2. The storage capacitor Cst charges the data signal applied to the control terminal of the driving transistor T2 and maintains the same when the switching transistor T1 is turned off.

The light emitting diode LED includes an anode connected to the output terminal of the driving transistor T2, and a cathode connected to a common voltage ELVSS. The light emitting diode LED displays an image by emitting light by controlling intensity according to the driving current Id of the driving transistor T2.

The switching transistor T1 and the driving transistor T2 may be n-channel field effect transistors (FET) or p-channel electric field effect transistors.

The present specification shows the structure of one pixel including two transistors and one capacitor, but it is not limited thereto, and the number of transistors and the number of capacitors are changeable in various ways.

An image of a display device including an inorganic layer according to an exemplary embodiment will now be described with reference to FIG. 12 and FIG. 13.

Figure 12:
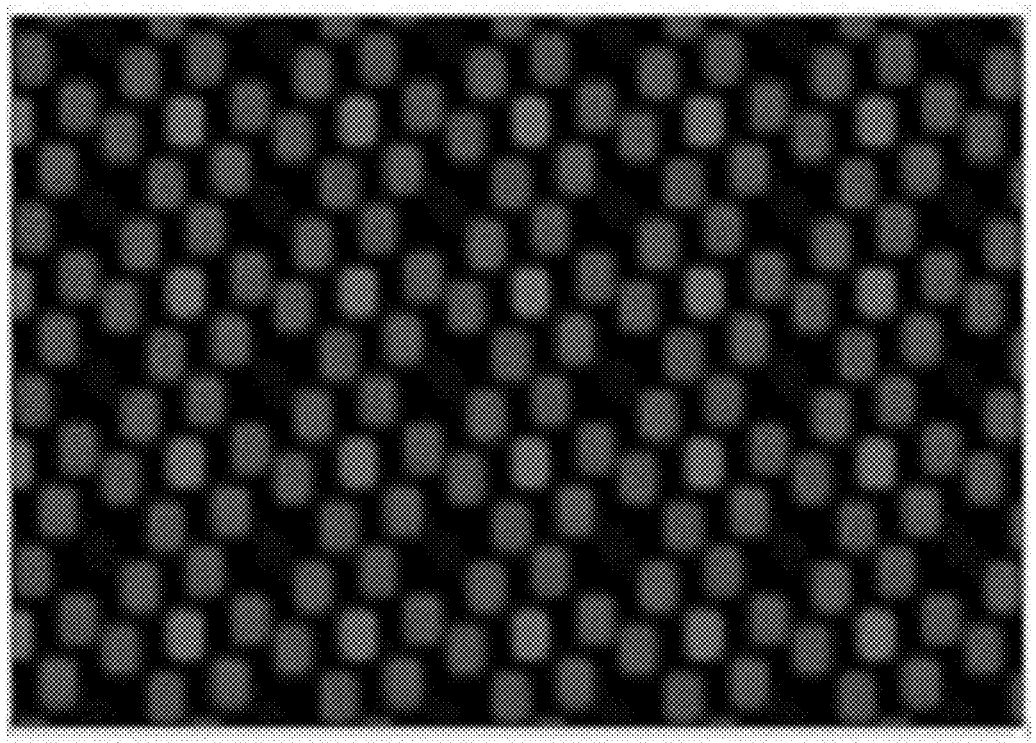
FIG. 12 and FIG. 13 show images of a display area visible to a user.
Figure 13:
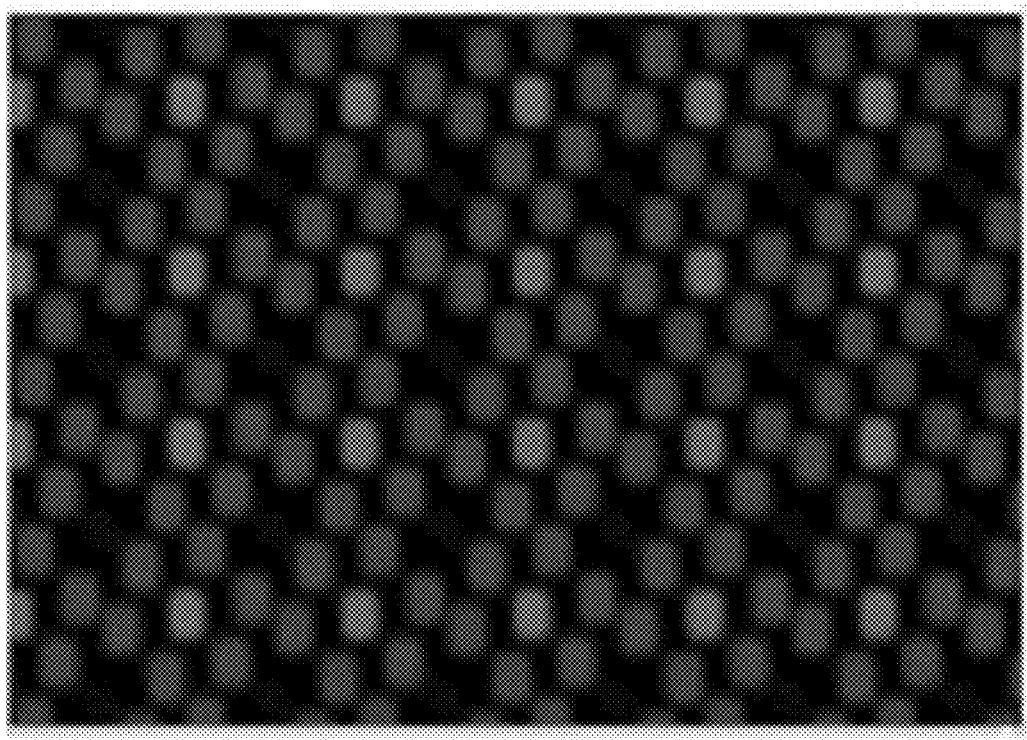

FIG. 12 shows an image on a pixel area having passed through a display panel including a single-layered inorganic layer, and FIG. 13 shows an image on a pixel area having passed through a display panel including a first auxiliary inorganic layer and a second auxiliary inorganic layer according to an exemplary embodiment.

It is confirmed that, with respect to the red pixel according to an exemplary embodiment of FIG. 12, an SDE index for determining whether the screen door effect is improved is reduced by about 0.2.

When the inorganic layer formed with double layers is included according to an exemplary embodiment, it is found that a reduction of the screen door effect caused by the inorganic layer is excellent.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a first substrate comprising a display area and a peripheral area;
a display unit disposed on the first substrate and comprising a plurality of pixels;
a second substrate disposed on the display unit; and
an inorganic layer disposed on the second substrate, wherein the inorganic layer comprises:
a first inorganic layer disposed on the second substrate and comprising an opening, wherein the opening extends through the first inorganic layer; and
a second inorganic layer disposed directly on the first inorganic layer and overlapping the openings, and
an upper surface of the second inorganic layer has a step.

2. The display device of claim 1, wherein
the second inorganic layer overlaps the display area.

3. The display device of claim 1, wherein
the second inorganic layer overlapping the opening contacts the second substrate.

4. The display device of claim 1, wherein
a plane form of the opening is circular.

5. The display device of claim 1, wherein
the inorganic layer is disposed on a second side facing a first side of the second substrate disposed toward the display unit.

6. The display device of claim 1, wherein
the inorganic layer comprises a concave portion and a convex portion.

7. The display device of claim 6, wherein
the concave portion overlaps the opening.

8. The display device of claim 6, wherein
a plane form of the concave portion is circular.

9. The display device of claim 6, wherein
a diameter of the concave portion is 55% to 85% of a distance between centers of two adjacent concave portion.

10. The display device of claim 6, wherein
a distance between centers of adjacent concave portion is 5 μm to 10 μm.

11. The display device of claim 6, wherein
a height difference between a first side of the concave portion and a first side of the convex portion is 5000 Å to 7000 Å.

12. The display device of claim 1, wherein
the inorganic layer overlaps the display area and the peripheral area.

13. The display device of claim 12, wherein
the inorganic layer comprises:
a first concave portion overlapping the display area, and
a second concave portion overlapping the peripheral area.

14. The display device of claim 13, wherein
a diameter of the first concave portion and a diameter of the second concave portion are substantially the same.

15. The display device of claim 13, wherein
a distance between centers of two adjacent first concave portions is a first pitch, and
a distance between centers of two adjacent second concave portions is a second pitch.

16. The display device of claim 15, wherein
the first pitch and the second pitch are substantially the same.

17. A display device comprising:
a housing;
a display panel mounted on the housing; and
an optical unit overlapping the display panel, wherein the display panel comprises:
a first substrate including a display area and a peripheral area, a display unit provided on the first substrate and including a plurality of pixels, and
an inorganic layer provided on the display unit and including a concave portion and a convex portion, and wherein:
the inorganic layer includes a first inorganic layer disposed on the display unit and comprising an opening, wherein the opening extends through the first inorganic layer; and
a second inorganic layer directly disposed on the first inorganic layer and overlapping the opening, and
an upper surface of the second inorganic layer has a step.

18. The display device of claim 17, wherein
the display device comprises a second substrate or an encapsulation layer disposed between the inorganic layer and the display unit.

19. The display device of claim 17, wherein
the inorganic layer overlaps the display area and the peripheral area.

20. The display device of claim 18, wherein the encapsulation layer comprises:
a first encapsulating inorganic layer,
a second encapsulating inorganic layer overlapping the first encapsulating inorganic layer, and
an encapsulating organic film disposed between the first encapsulating inorganic layer and the second encapsulating inorganic layer.

21. The display device of claim 20, wherein the inorganic layer is disposed on the second encapsulating inorganic layer.

\* \* \* \* \*